United States Patent [19]
Lunkas et al.

[11] Patent Number: 5,051,294
[45] Date of Patent: Sep. 24, 1991

[54] CATALYTIC CONVERTER SUBSTRATE AND ASSEMBLY

[75] Inventors: Michael J. Lunkas, Otisville; Matthew W. Spilker, Flint, both of Mich.

[73] Assignee: General Motors Corporation, Detroit, Mich.

[21] Appl. No.: 351,618

[22] Filed: May 15, 1989

[51] Int. Cl.⁵ .................. B32B 3/28; B01J 21/04; B21D 5/14

[52] U.S. Cl. ..................... 428/184; 428/68; 428/183; 428/185; 428/120; 428/332; 428/604; 428/156; 29/DIG. 48; 72/176; 72/177; 72/42.96; 72/79.2; 72/379.6; 55/521; 156/205; 156/207; 156/210

[58] Field of Search ............... 428/182, 184, 119, 120, 428/156, 604, 603, 68, 72, 183, 185, 178, 332, 457; 29/527.4, 527.2, DIG. 48, 890.039, 425, 457, 33 b, 121.1; 228/141.1, 173.6, 178, 190; 422/179, 221, 180, 34; 502/527, 439; 72/176, 177, 342.96, 379.2, 379.6; 55/521; 156/205; 207, 210; 148/127; 219/78.01, 87, 118, 121.11, 86.1, 117.1, 136, 137 R, 148

[56] References Cited

U.S. PATENT DOCUMENTS

| 3,183,963 | 1/1963 | Mondt | |
|---|---|---|---|
| 3,860,535 | 1/1975 | Johnson | 252/472 |
| 4,098,722 | 7/1978 | Cairns | 428/183 |
| 4,186,172 | 1/1980 | Scholz | 422/180 |
| 4,280,926 | 7/1981 | Abe et al. | 252/430 |
| 4,282,186 | 8/1981 | Monnemann et al. | 422/180 |
| 4,381,590 | 5/1983 | Nonnemann et al. | 29/157 R |
| 4,382,323 | 5/1983 | Chapman et al. | 29/157 R |
| 4,559,205 | 12/1985 | Hood | 422/180 |
| 4,576,800 | 3/1986 | Retallick | 422/180 |
| 4,602,001 | 7/1986 | Cyron | 502/439 |
| 4,619,912 | 10/1986 | Jalbing | 502/439 |
| 4,647,435 | 3/1987 | Nonnemann | 422/180 |
| 4,753,919 | 6/1988 | Whittenberger | 502/439 |

FOREIGN PATENT DOCUMENTS

2815317A1 12/1979 Fed. Rep. of Germany .

Primary Examiner—Ellis P. Robinson
Assistant Examiner—Donald J. Loney
Attorney, Agent, or Firm—Karl F. Barr, Jr.

[57] ABSTRACT

A substrate for a catalytic converter is formed of steel sheets embossed with corrugations in a chevron pattern such that the metal buckles at vertices of adjoining corrugations to form projections extending out of the plane of the sheet. The sheets are stacked with the projections registered to form weld points and capacitive discharge welding secures the sheets together. The substrate is formed in two halves which are clamped together and then secured by end rings.

11 Claims, 2 Drawing Sheets

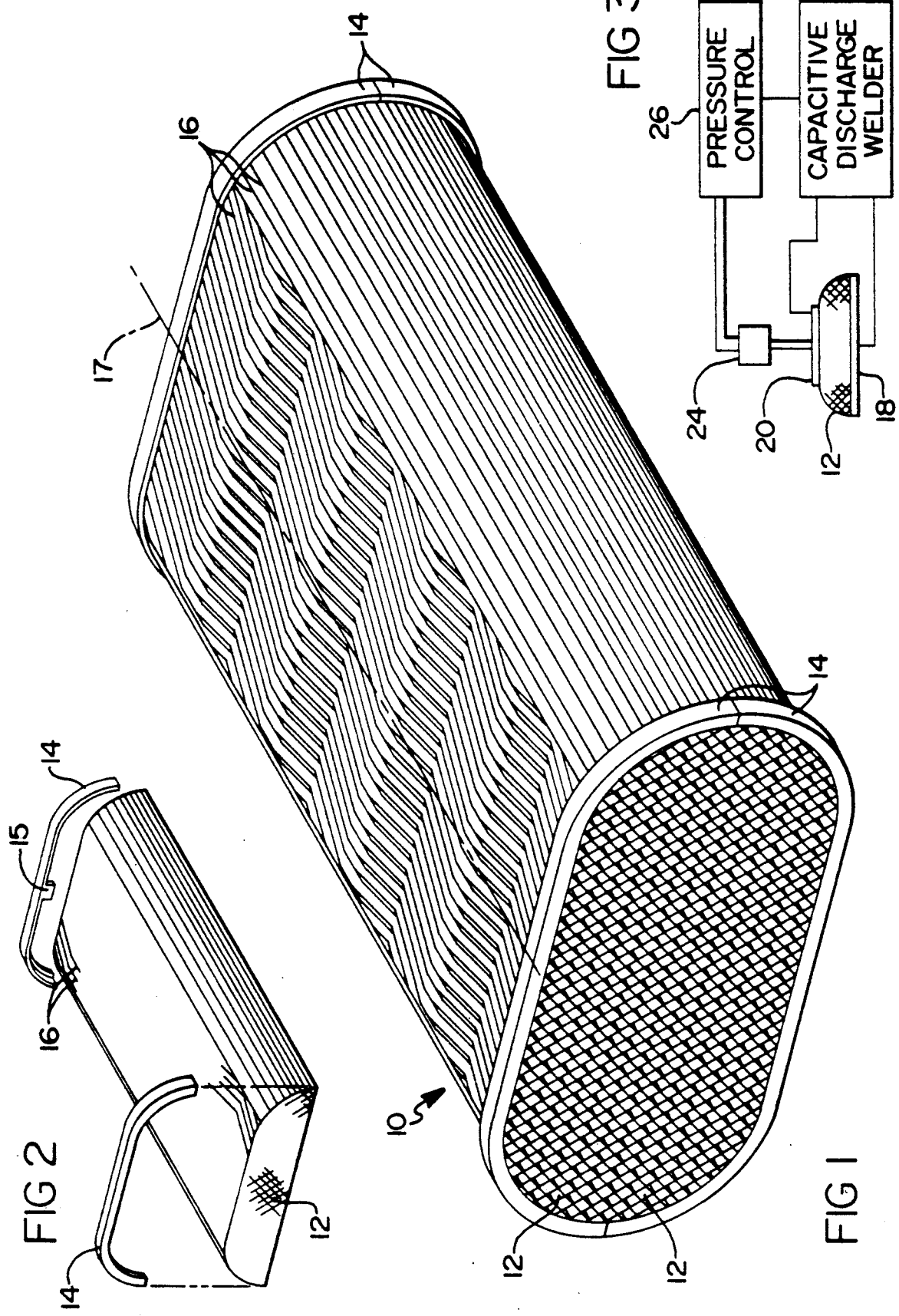

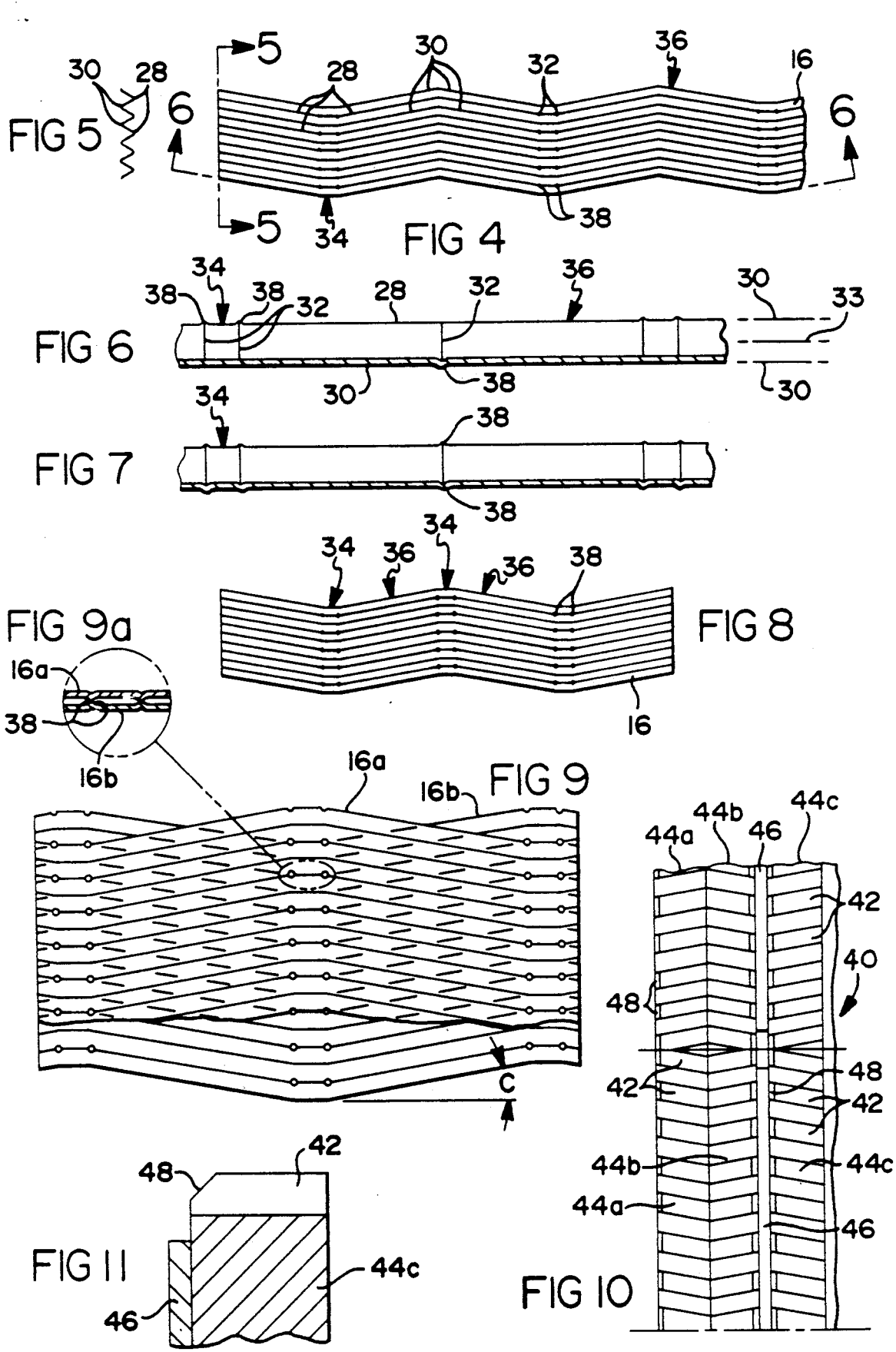

CATALYTIC CONVERTER SUBSTRATE AND ASSEMBLY

FIELD OF THE INVENTION

This invention relates to a welded metal substrate for a catalytic converter and particularly to a metal substrate assembly for a catalytic converter.

BACKGROUND OF THE INVENTION

In catalytic converters for automotive vehicles catalysts are supported on substrates having a large area and exhaust flow passages over the area so that intimate contact between the exhaust gas and the catalyst can occur. Honeycomb substrates formed of foil strips have been proposed but they are typically deficient in some respect and/or present problems from a manufacturing and/or functional standpoint. For example, it is known to form the honeycomb substrate by spirally winding strips of smooth and corrugated foil but there results the problem of relative telescoping or sliding between the layers which first abrades the catalyst and can end in structural failure. With such an arrangement, it is difficult to maintain the integrity of the metal substrate without some form of mechanical strengthening or bonding of the layers. Then there remains another major problem of allowing design flexibility in the shape of the metal-layered substrate cross-section to meet various space allocations while maintaining a curved profile for housing strength reasons. This is particularly important in meeting certain vehicle underfloor space requirements where a low profile cross-section of, for example, oval shape is desired over a circular one which requires a larger height for the same frontal area. Moreover, there is the difficulty and expense of manufacture in completely forming a metal-layered substrate so as to be suitable for a final step of applying the catalyst coating.

There have been several proposals for containing the corrugated foil in the desired profile using some form of welding, brazing or mechanical retention. The latter approach is disclosed by U.S. Pat. Nos. 4,619,921 and 4,559,205 assigned to the assignee of the present invention. In both of these patents alternating layers of smooth foil and corrugated foil of varying widths are stacked to achieve the desired oval profile and then are sheathed in a retainer comprising a pair of metal shells which are assembled by pressing them over the foil layers and then welding the shells together at their mating plane. The patents described below utilize welding of the foil. U.S. Pat. No. 4,186,172 shows a spirally wound structure of circular cross-section having alternating smooth and corrugated sheets. The welding is done by laser beam or electron beam welders either during the winding process or after winding. U.S. Pat. No. 4,282,186 also shows a spiral wound structure but which has a hollow center so that it may be flattened to form an oval racetrack profile. Spot welds are made in the end faces of the foil matrix by electron beam; or brazing of the end faces may be used instead. In another version, instead of welding the end faces of the foil, semi-elliptical half-shells are pressed around the matrix and welded together to maintain the oval shape.

It is known to form chevron patterns in metal foil sheets and to stack the sheets into assemblies having a large surface area for supporting catalysts and having gas flow passages to promote contact of the exhaust gas with the catalyst. U.S. Pat. No. 4,382,323, assigned to the assignee of the present invention, shows such a chevron pattern foil wound in a spiral but the manner of retaining it in a wound shape is not disclosed. Ridges in the adjacent layers of the foil abut and cross one another at their peaks to form passages between the sheets. U.S. Pat. No. 4,753,919 discloses a method for optimizing the number of contact points between confronting surfaces of an accordion folded metal foil corrugated in a chevron pattern by specifying a certain mathematical relationship of the chevron and foil dimensions. The manner of securing the layers of the stack is not discussed.

SUMMARY OF THE INVENTION

It is therefore an object of the invention to provide a substrate for a catalytic converter especially configured for welding together and adapted for welding many layers of foil by a single welding event.

It is another object of the invention to provide such a substrate having weld projections that make contact points between adjacent sheets to facilitate capacitor discharge welding of the sheets.

Another object is to provide such a substrate by assembling each of two half substrates by welding and securing the two halves together by welded end rings.

The invention is carried out by an assembly of corrugated metal foil sheets for a substrate comprising: a stack of corrugated sheets secured together so that a plurality of fluid flow paths are defined between the sheets, each sheet having a centerline and a plurality of rows of corrugations extending transverse to the centerline and each row having corrugation ridges in a chevron pattern with the ridges of adjacent rows having different directions, the corrugation ridges having peaks which meet at vertices at the boundaries of adjacent rows, the peaks defining planes, each sheet having projections located on at least some of the vertices and extending outwardly from said planes into contact with an adjacent sheet in the stack, and the sheets being welded together at the projections.

The invention is further carried out by a corrugated metal foil substrate for a catalytic converter comprising a plurality of corrugated foil sheets made by the steps of: forming each of a plurality of corrugated sheets by crimping a plain sheet with rows of angled corrugations to form a chevron pattern with vertices at adjoining rows, the angle between the corrugations at the vertices being sufficient to form outstanding projections normal to the median plane of the sheet, stacking a plurality of corrugated sheets with the projections of one sheet extending toward and in contact with an adjacent sheet, the stack being bounded by upper and lower sheets, and the stack being united by passing a pulse of weld current through the stack from electrodes at the upper and lower sheets to resistance weld the sheets together at the projections.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an isometric view of a fully assembled substrate according to the invention.

FIG. 2 is an exploded view of a half substrate and associated half rings,

FIG. 3 is a schematic view of apparatus for welding together corrugated sheets to form a half substrate according to the invention, FIG. 4 is a plan view of a corrugated sheet for a substrate according to a first embodiment of the invention, FIG. 5 is an end view of the sheet of FIG. 4 taken along line 5—5 of FIG. 4, FIG. 6 is an enlarged sectional view of the sheet of FIG. 4 taken along line 6—6 of FIG. 4 which follows along a valley of the sheet, FIG. 7 is a sectional view of a sheet similar to that of FIG. 6 but modified according to a second embodiment of the invention, FIG. 8 is a plan view of a corrugated sheet for a substrate according to a third embodiment of the invention, FIG. 9 is a partly broken away plan view of two adjacent superimposed sheets according to the third embodiment, FIG. 9a is an enlarged sectional view of a portion of FIG. 9, FIG. 10 is a partly broken away front view of tooling for producing the corrugated sheets according to the invention, and FIG. 11 is an enlarged view of a tool tooth of the tooling of FIG. 10.

DESCRIPTION OF THE PREFERRED EMBODIMENT

Corrugated sheets for a catalytic converter substrate are advantageously secured together by resistance welding to form a secure core assembly. Because of the large number of sheets involved in each substrate the prior art practice of separately welding pairs of adjacent sheets is time consuming and expensive. Thus the welding of all or at least many sheets at once is an attractive alternative. It has been found that capacitive discharge welding is capable of making satisfactory welds when the sheets have been properly formed with weld projections which define precise weld points of a number and size to present the proper weld resistance.

FIG. 1 shows a converter substrate 10 which is made up of two half substrates 12 held together at their ends by half rings 14 which are assembled to the halves as shown in FIG. 2 and welded at their ends to complete the full substrate assembly. The rings 14 are L-shaped in cross section to overlie a portion of the substrate outer surface as well as a marginal portion of the end faces. A tang 15 depending from the center of each half ring 14 pierces the outer layers of sheets to hold the rings in place.

As is evident in FIG. 1 the assembly is formed of a stack of corrugated sheets 16 of equal lengths but of varying widths so that an oval profile is attained. Each sheet has a centerline 17 parallel to the longitudinal axis of the substrate. The corrugations in the sheets have a modified chevron configuration so that adjacent sheets define exhaust gas passages in a direction to foster generally longitudinal gas flow. Such corrugations, as is well known, provide extensive area for the residence of catalyst material and contact of the gas with the catalyst material. As will be further described, the chevron corrugations can be formed with ridges meeting at vertices so that the sheet metal buckles a controlled amount at the vertices to form weld projections. The sheets are laid up in a stack so that the projections on adjacent sheets make contact. As shown in FIG. 3 the stack of sheets for one half the substrate are placed between the electrodes 18 and 20 of a capacitive discharge welder 22 and compressed sufficiently to assure good contact at the weld projections. The upper electrode 20 is manipulated by an air pressure operated actuator 24 for opening and closing and for applying the welding pressure under control of a pressure control 26.

The welder 22 is capable of delivering a single pulse of current to effect welding at the projections. As is well known, a capacitive discharge welder comprises a transformer with a bank of large capacitors in the primary and means for charging the capacitors to a high voltage, and weld electrodes in the secondary for delivering a discharge current at a low voltage. For a stack of 48 sheets approximately 1 ¾ inches thick and measuring 6×6 inches for the largest and 3×6 inches for the smallest sheet, the weld current pulse is 1 to 1.5 milliseconds long and delivers 28,000 joules energy at 150 volts.

The modified chevron pattern shown in FIGS. 4, 5 and 6 is a series of ridges or peaks 28 which define planes 30 and are arranged at angles to one another so that they meet at vertices 32. A median plane 33 of the corrugated sheet is shown halfway between the planes 30 of the peaks. The corrugation ridges are arrayed in parallel rows of like ridges, the rows extending transverse or perpendicular to the sheet centerline 17. Narrow rows have short ridges or segments 34 while wide rows have long segments 36. The segment lengths between vertices include short segments 34 or lands with ridges running parallel to the centerline 17 of the sheet and long segments 36 which extend at an angle to the centerline. The long segments 36 come together at one set of vertices 32 and the short segments 34 are interposed between long segments 36 to form another set of vertices. In either case the metal buckles to project beyond the peak plane 30 in a direction perpendicular to the plane 30 or 33 to form points or projections 38 at some of the vertices. FIG. 6 shows that the projections 38 at the short segments extend upwardly and the projections 38 between the long segments extend downwardly. When the sheets are stacked together for welding, alternate sheets are flipped over to register the points of adjacent sheets. In an alternative configuration the projections 38 may extend up and down from each vertex as shown in FIG. 7.

One effect of the short segments is to increase the number of projections compared to a pattern having long segments only. In the embodiment of FIGS. 8 and 9 all long segments 36 are separated by short segments 34 so that short and long alternate. In addition, projections extend from every vertex 32. This pattern optimizes the number of projections 38. The modified chevron patterns described above and shown in the Figures are preferred for the optimization of contact projections, however, it should be noted that a standard chevron pattern having alternately angled corrugation ridges 36 without short segments 34 interspaced therebetween (not shown) is an acceptable alternative.

The lay-up of sheets 16 in a stack is illustrated in FIG. 9 for a pair of adjacent sheets 16a and 16b where the upper sheet 16a is broken away to reveal the lower sheet 16b. FIG. 9a is a cross section which shows how the projections from adjacent sheets are registered to form a weld site.

The chevron angle c (FIG. 9) between the long segment 36 and the short segment 34 is optimized to enhance the formation of rounded somewhat conical projections 38. For stainless steel foil 0.002 inch thick having a corrugation pitch of 0.089 inch and a corrugation height (peak-to-peak) of 0.04 inch, the preferred angle c is 10 degrees. An acceptable range for angle c is 8 to 14 degrees. The required projection is not obtained at angles less than 8 degrees. At an angle c of 10 degrees the projections 38 are large enough to form a generally circular contact area having a diameter of 0.005 inch when like projections are pressed together. Each projection has a height on the order of 0.001 inch.

Where a curved substrate profile is desired, sheets made according to the patterns of any one of the above described embodiments are cut in varying widths to conform the desired core profile when assembled. If a rectangular core section is preferred, the sheets will all have the same width. Adjacent sheets are oriented with projections registered for contact. A stack of sheets for a half substrate 12 is placed between the electrodes 18 and 20 of the welder and weld pressure applied. Then a single pulse of weld current is directed through the stack to complete the welds at the contacting projections. Two such welded half substrates are clamped together and the half oval rings 14 are applied to the ends of the substrate halves 12 with the tang 15 piercing the outer sheets. The abutting ends of the half rings 14 are welded together to complete the assembly of the substrate.

As an alternative to welding substrate halves and holding them together by end rings, the sheets may be all welded together at the contacting projections: then the end rings will not be necessary. One approach to the all welded structure is to weld all the sheets at once instead of in halves. Depending on the desired profile, stacking the sheets with the projections maintained in registry may be somewhat involved or obtaining adequate welds through the stack may be difficult. Another approach is to weld the sheets into small packets and then welding two, three or more packets together to make the whole core. The choice of assembly methods depends on the ability to weld a large stack of sheets in the desired profile or to weld together the packets of sheets.

Tools 40 for corrugating the foil sheets are shown in FIG. 10. Gear-like rotary tools mesh together to roll the corrugations into a plain foil. The corrugation pattern of FIGS. 5 and 6 is produced by the illustrated tools 40. Teeth 42 on each wheel 44a, 44b, 44c have alternate right and left pitches to form rows of corrugations of opposite angles in the foil. Spacers 46 between wheels 44b and 44c separate those wheels. The corrugations parallel to the centerline are formed in this space without benefit of a toothed wheel to positively form those corrugations. The metal bending action at the adjacent wheels is sufficient to form the corrugations in the space. A further benefit is that the projections 38 at the vertices of the corrugations are also formed here due to the buckling at the bend of the metal peaks. A relief in the form of a chamfer 48 on each tooth edge adjacent to a spacer 46, as best shown in FIG. 11, enhances the projection formation. A 45 degree chamfer 48 of 0.05 inch width provides satisfactory relief. While the projections 38 are best formed at the chamfer in the regions adjacent a short segment 34, they also occur at the vertices of two long segments 36 as formed by wheels 44a and 44b. If the pattern of FIGS. 8 and 9 is desired, a spacer will be used between every pair of wheels 44a, 44b, etc. and both ends of each tooth 42 will be chamfered.

The embodiments of the invention in which an exclusive property or privilege is claimed are defined as follows:

1. An assembly of corrugated metal foil sheets for a substrate comprising:
    a stack of corrugated sheets secured together so that a plurality of fluid flow paths are defined between the sheets,
    each sheet having a centerline and a plurality of rows of corrugations extending transverse to the centerline, said rows oriented in a chevron pattern with the ridges of adjacent rows alternately extending at an angle of 8 degrees or greater to said centerline in either direction,
    the corrugation ridges having peaks which meet at vertices at the boundaries of adjacent rows, the peaks defining planes on opposite sides of each sheet,
    each sheet having projections located on at least some of the vertices and extending outwardly from said planes into contact with an adjacent sheet in the stack, and
    the sheets being welded together at points of contact between said projections and said adjacent sheet.

2. The invention as defined in claim 1 wherein the projections of each sheet are aligned with and in contact with the projections of an adjacent sheet.

3. An assembly of corrugated metal foil sheets for a substrate comprising:
    a stack of corrugated sheets secured together so that fluid flow channels are defined between the sheets,
    each sheet having a centerline and a plurality of rows of corrugations extending transverse to said centerline, said rows oriented in a chevron pattern with some rows having corrugations extending at an angle of 8 degrees or greater to said centerline in either direction and other rows having corrugations extending parallel to said centerline with the corrugation patterns of adjacent rows having different directions,
    the corrugation ridges having peaks which meet at vertices at the boundaries of adjacent rows, the peaks defining planes on opposite sides of each sheet,
    each sheet having projections located on at least some of the vertices and extending out of their respective planes into contact with an adjacent sheet in the stack, and
    the sheets being welded together at points of contact between said projections and said adjacent sheet.

4. The invention as defined in claim 3 wherein said chevron pattern comprises rows of corrugations which alternate with two adjacent rows having corrugations at an angle to the centerline in either direction and a third row having corrugations extending parallel to said centerline.

5. The invention as defined in claim 3 wherein said chevron pattern comprises rows of angled corrugations which alternate in direction and are separated by a row of corrugations parallel to said centerline.

6. The invention as claimed in claims 3, 4 or 5 in which the said angle to the centerline of the corrugations is in the range of 8 degrees to 14 degrees and the width of the row with corrugations parallel to the centerline is less than half the width of the rows with angled corrugations.

7. The invention as claimed in claims 3, 4 or 5 in which the foil is stainless steel approximately 0.002 inch thick and the said angle to the centerline of the corrugations is about 10 degrees.

8. A catalytic converter substrate comprising:
upper and lower half substrates secured together to form a whole substrate,
each half substrate having a stack of corrugated sheets welded together to define flow channels,
each sheet having a median plane and a centerline in the median plane and plurality of rows of corrugations extending transverse to said centerline, said rows oriented in a modified chevron pattern with some rows having corrugations extending at an angle of 8 degrees or greater to said centerline in either direction and other rows having corrugations extending parallel to said centerline with the corrugation patterns of adjacent rows extending in different directions,
the corrugation ridges having peaks which meet at vertices at the boundaries of adjacent rows,
each sheet having projections located on at least some of the vertices and extending normal to the median plane into contact with an adjacent sheet in the stack,
the sheets being welded together at points of contact between said projections and said adjacent sheet, and
half-rings conforming to the half substrate contour and attached to each end of each half substrate, the half-rings at each end of the substrate being welded together to secure the complete substrate.

9. A corrugated metal foil substrate for a catalytic converter comprising a plurality of corrugated foil sheets made by the steps of:
forming each of a plurality of corrugated sheets by crimping a plain sheet with rows of angled corrugations to form a chevron pattern with vertices at adjoining rows, the angle between the corrugations at the vertices being 8 degrees or greater to facilitate the formation of outstanding projections normal to the median plane of the sheet,
stacking a plurality of corrugated sheets with the projections of one sheet extending toward and in contact with an adjacent sheet, the stack being bounded by upper and lower sheets, and
the stack being united by passing a pulse of weld current through the stack between the upper and lower sheets to weld the sheets together at the projections.

10. The invention as defined in claim 9 wherein the sheets vary in width to form a half-oval contour and wherein a complete oval substrate is formed by assembling two half-oval stack and welding a retaining collar around each end of the assembled stacks.

11. The invention as defined in claim 9 wherein each sheet has a centerline and the corrugation pattern is formed with three interdigitated sets of corrugations comprising a set with corrugations parallel to the centerline and two sets with corrugations extending at an angle in either direction from the centerline, and the sheets are stacked with the projections on each sheet substantially in contact with projections on adjacent sheets.

* * * * *